United States Patent [19]

Secor

[11] 4,110,491
[45] Aug. 29, 1978

[54] METHOD AND APPARATUS FOR ENCAPSULATING AND COAGULATING ELASTOMERS

[75] Inventor: Robert Miller Secor, Wilmington, Del.

[73] Assignee: E. I. Du Pont de Nemours and Company, Wilmington, Del.

[21] Appl. No.: 700,966

[22] Filed: Jun. 29, 1976

[51] Int. Cl.² .................... B05B 7/02; B05B 7/24; C08C 1/14
[52] U.S. Cl. ................... 427/212; 118/602; 260/821; 427/222; 428/407; 427/430 R; 264/4
[58] Field of Search ........... 427/3, 212, 221, 430; 428/304, 307, 323, 327, 331, 407; 264/7, 4; 260/821, 29.7 PT; 118/602

[56] References Cited

U.S. PATENT DOCUMENTS

| | | | |
|---|---|---|---|
| 2,531,986 | 11/1950 | Pile et al. | 264/4 |
| 2,561,256 | 7/1951 | Wilson et al. | 260/821 |
| 3,001,228 | 9/1961 | Nack | 264/7 |
| 3,036,338 | 5/1962 | Nack | 264/7 |
| 3,054,824 | 9/1962 | Heinz | 260/923 |
| 3,653,959 | 4/1972 | Kehr et al. | 427/3 |
| 3,969,334 | 7/1976 | Shimizu et al. | 260/821 |
| 3,969,547 | 8/1974 | Isawa et al. | 427/221 |

*Primary Examiner*—George F. Lesmes
*Assistant Examiner*—R. Eugene Varndell, Jr.

[57] ABSTRACT

Method and apparatus for encapsulating and coagulating an elastomeric latex wherein the latex is introduced as drops into an encapsulating-coagulating liquid via a draft tube through which the encapsulating-coagulating liquid is impelled downwardly in generally linear flow, and thereafter recycling the encapsulating-coagulating liquid into the top of the draft tube free of particulate elastomeric product.

2 Claims, 2 Drawing Figures

METHOD AND APPARATUS FOR ENCAPSULATING AND COAGULATING ELASTOMERS

RELATED PATENT APPLICATION

The invention of this application is employed to manufacture the "nontacky Shaped Objects from Polymer Latices" as taught in the M. J. Marquisee application Ser. No. 700,965 filed of common date herewith and of common assignment.

BRIEF SUMMARY OF THE INVENTION

Generally, this invention relates to method and apparatus for encapsulating and coagulating elastomeric latices comprising, in sequence, supplying the latex as separate drops by gravity fall through the surface of an encapsulating-coagulating liquid followed by liquid-impelled generally linear transit of the particles through a vertically-oriented flow-constrained zone to which encapsulating-coagulating liquid is supplied continuously at the top end and suspending the particles outside the constrained zone while recycling the encapsulating-coagulating liquid from the lower end of the constrained zone into the top end free of particulate elastomeric product.

DRAWINGS

Figure 1:
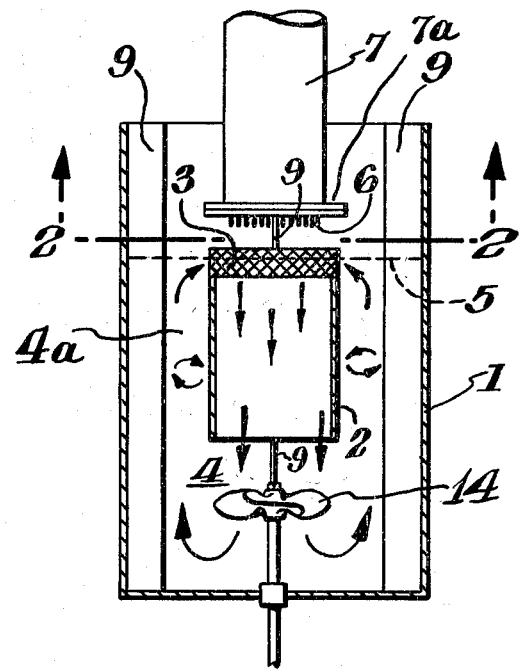
Figure 2:
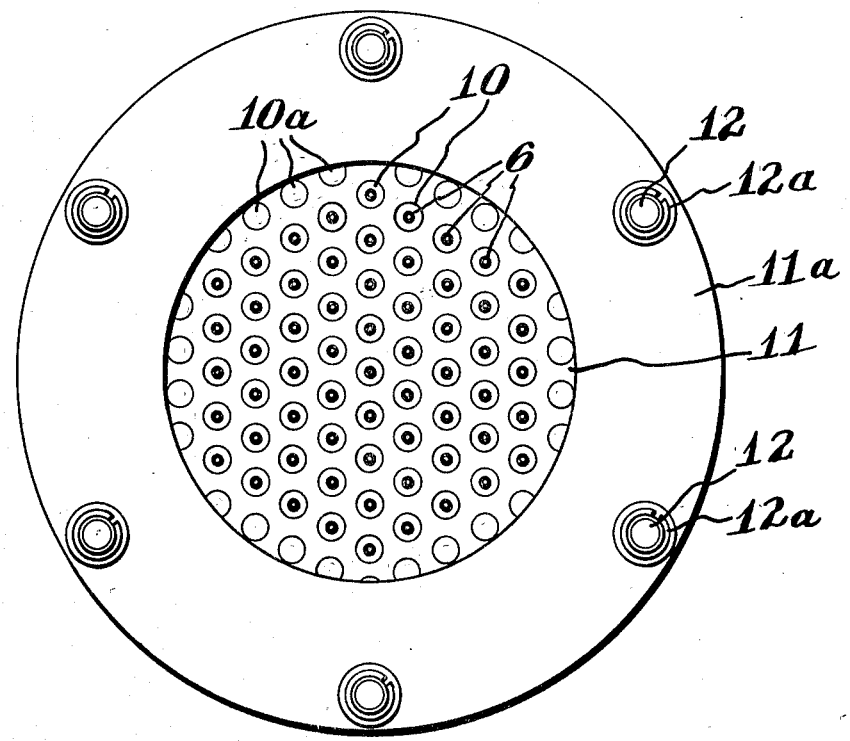

The following drawings constitute part of this specification, in which:

FIG. 1 is a partially schematic representation in side elevation cross-section of a preferred embodiment of apparatus according to this invention, and FIG. 2 is a somewhat enlarged plan view of the latex standpipe supply head of the apparatus of FIG. 1 looking upwards in the direction of line 2—2, FIG. 1.

BACKGROUND

Marquisee Application Ser. No. 700,965 hereinbefore identified, relates to the process and resulting products obtained when it is desired to manufacture an elastomeric particulate (or other) product encapsulated within an integral inorganic oxide coating imparting nontackiness to elastomeric polymers concurrently with their coagulation from conventional elastomeric latices. This is particularly advantageous as compared with the heavy loadings of particulate materials, such as talc, which have previously been used to render uncured elastomeric objects nontacky. In addition, it is practicable to produce smaller size elastomer objects than was possible with prior art methods.

Marquisee's preferred elastomer is "neoprene", by which is meant an elastomer comprising at least about 50% chloroprene (i.e., 2-chloro-1, 3-butadiene); however, his process is applicable to a wide class of other elastomers containing also comonomers, e.g., vinyl aromatic compounds, such as styrene, and a number of other substances, depending on the properties desired in the final products, so that reference is made to said cofiled Application for all details of chemical constitution, proportions of ingredients and similar detailed information not directly involved with the instant invention.

Several issued patents teach processes for elastomer coagulation; however no art is known which teaches Marquisee's concomitant encapsulation and coagulation.

For example, Semon U.S. Pat. No. 2,366,460 discloses coagulation by jet-to-jet impacting of the latex dispersion with a liquid coagulant, together with other embodiments wherein turbulent flow is deliberately maintained during at least the initial stages of coagulation. Yacoe U.S. Pat. No. 2,879,173 manufactures free-flowing pellets of polychloroprene by freezing the elastomer suspended in an organic liquid, after which the solid frozen pellets are removed for further processing. Heinz et al. U.S. Pat. No. 3,053,824 shows coagulation of a phosphate or borate buffered elastomer latex by running it into an aqueous aluminum or titanium salt solution containing also an alkali metal or alkaline earth metal salt. The Patent states that the resulting coagulated particles do not stick together before being washed to remove the coagulating salts. There is no statement as to the tack of the particles after washing. It appears that Applicant's apparatus can, if desired, be used to practice the Heinz et al. process. Finally, Berg et al. U.S. Pat. No. 3,846,365 teaches the obtainment of coagulated elastomer particles by emulsification in an organic solvent using an ammonium salt cationic surfactant additive.

In brief, said Marquisee process is directed to the preparation of nontacky, elastomeric shaped objects by bringing shaped bodies of a normally tacky, uncured elastomer latex having a solids content of 20 to 65% by weight into contact with an aqueous bath containing, based on the total weight of the bath, (a) about 0.5 to about 25% by weight of a soluble coagulating salt for the latex, and (b) about 0.01 to about 5% by weight of a soluble or colloidally dispersed, hydrous inorganic oxide selected from the group consisting of silicic and aluminic acid polymers, silicic acid-aluminic acid copolymers, and mixtures thereof, the bath having a pH of about 2 to 7 such that, when a drop of 1.0 N NaOH is added to the bath, the drop is immediately surrounded by a cloudy coating of gelled, hydrous inorganic oxide polymer, thereby coagulating the latex and forming highly porous shaped objects of the coagulated elastomer coated with water insoluble, hydrous, inorganic oxide polymer. These shaped objects can then be washed with water until the water soluble material is less than about 3% by weight, and dried until the volatile material content is less than about 1% by weight, thereby providing free-flowing, nontacky elastomeric shaped objects. This invention is particularly suitable for producing non-tacky pellets or filaments of uncured neoprene.

There is a large market for elastomer pellets having a minimum dimension of about 0.01 to about 10 millimeters, "minimum dimension" being the diameter of the smallest round hole through which the shaped object will pass lengthwise. The encapsulating coating is denoted "integral", by which is meant that it is unitary in the sense that it is not composed of discrete particles such as is the case with a dusted powder or coating.

The instant invention is described particularly with respect to drop-wise pellet formation. The objects, including the pellet form, are unique in that, prior to removing the water soluble and volatile materials, they are highly porous. This porosity is evidenced by the objects being opaque in appearance when dispersed in water, and by their cross-section having a vesicular structure in micrographs. Because of this porosity, water soluble and volatile materials are easily removed by washing and drying techniques. Some of the porosity is retained even after washing.

THE INVENTION

This invention comprises a preferred method and apparatus for introducing and advancing the tacky shapes of polymer latices into and through a solution or an aqueous dispersion of a hydrous inorganic oxide or copolymer thereof containing a dissolved latex-coagulating salt and separating therefrom nontacky, precipitated shaped objects of porous elastomer. In order to carry out this process on a commerical scale for the manufacture of pellets particularly, it is necessary to form a great number of drops of latex simultaneously and then subsequently encapsulate and coagulate them. The drops are ideally of uniform size and should not agglomerate either before or after coating.

A preferred apparatus according to this invention utilizes a vertically oriented open-ended draft tube to define a flow-constrained zone through which the encapsulating-coagulating liquid is passed downwardly in generally linear flow.

By "generally linear flow" into and through draft tube 2, as the term is used in this description and the claims, it is meant that the travel courses taken by product particles through bore 2' are along generally distinct separate paths viewed as linear in plan (i.e., via the paths denoted by the downwardly directed straight arrows of FIG. 1), even though, of course, the bath liquid flows along curved paths (as denoted by the curved arrows) when entering the top end of draft tube 2. Moreover, while the apparatus of FIGS. 1 and 2 supra preserves turbulent flow within volume 4, turbulent flow is not absolutely essential here, although it does speed the overall latex coagulation.

Generally linear flow keeps the particles out of contact with each other while, at the same time, affording enough time to effect the bulk of the protective encapsulation, and at least initiate the coagulation. Thereafter, when the particles emerge from the lower end of the tube, they can safely enter the main body of the bath wherein rather vigorous agitation is maintained in order to complete the coagulation efficiently. The bath liquid is continuously recycled through the draft tube.

Coagulation baths, especially when agitated, are characterized by foaminess and it is essential that this foam be excluded from the interior of the draft tube. At the same time, product particles should also be barred from the draft tube; otherwise they constitute sites for agglomeration with the fresh tacky elastomer drops being continually supplied to the upper end of the draft tube. Various designs of screens or weirs, as hereinafter taught, are effective to exclude both foam and encapsulated particles from the draft tube while permitting unimpeded recycling of the bath liquid.

Referring to FIG. 1, the tank within which the bath is contained is denoted 1, the operating level of the bath being denoted by broken line 5. In a small size apparatus, tank 1 was 11⅝ inches (29.5 cm) inside dia. by 18 inches (45.7 cm) deep and was carried from about 60 to 75% full progressively during the batch operation hereinafter described. Draft tube 2 was an open-ended cylindrical pipe 5 inches (12.7 cm) inside dia. × ¼ inch (6.35 mm) thick by 6 inches (15.2 cm) long and was hung concentrically from latex supply tube 7 (also being concentric with tank 1) by a pair of depending metal straps (not shown), so that tube 2 was movable upwardly together with movable supply tube 7 in order to facilitate preselected vertical placement of the draft tube with reference to the particular bath level carried. Draft tube 2 and tank 1 can be fabricated from a wide range of rigid materials including, for example, glass, metal or plastic.

In the preferred design of FIG. 1, draft tube 2 is extended at the top end by the addition of an open-ended screen ring 3, the upper end of which is always carried sufficiently higher than bath level 5 to bar the passage of foam and particles from the annular portion 4a of volume 4 into the top end of draft tube 2. The mesh size of screen ring 3 is preselected (typically, 20 mesh) to exclude the passage of product particles from volume 4a into the upper end of draft tube 2.

Drops or discrete masses of polymer latex are introduced to the bath surface within screen ring 3 and immediately enter the top end of the flow-constraining draft tube 2. Each stream of latex drops is conveniently delivered to draft tube 2 via stainless steel capillary tubes 6, typically 0.75 inch long (1.91 cm) by 34 mils (0.86 mm) inside dia. by 51 mils (1.27 mm) outside dia. Each capillary tube was mounted within an individual polytetrofluroethylene plug 10 frictionally retained within corresponding bores in the polymer supply tube closure plate 11, which is provided with an encircling flange 11a drilled with a peripheral array of screw holes 12 for screw attachment of the plate to the companionate flange 7a fixed to the lower end of latex supply tube 7 (typically, 4 inches, or 10.16 cm, inside dia.). Components 12a are split-ring washers for the attachment screws (not shown), whereas 10a are solid polymeric plugs closing off any bores which it is desired not to use. A typical closure plate 11 is provided with 61 capillaries in hexagonal array, as shown in FIG. 2, at center-to-center pitches of 0.44 inch (1.12 cm). The frequency of drop addition to the bath was adjusted by varying the level of latex in latex supply tube 7. Typically, drop addition rate was in the range of 4–10 drops per sec. per capillary, or even higher. Drop size appears to be independent of drop feed rate.

There must be power-driven liquid circulating means, such as an agitator 14, a pump, eductor or a like device to maintain orderly bath solution transit downwards through draft tube 2 and thence upwards preferably in turbulent flow, through the annular volume 4a between draft tube 2 and tank 1. A 6 inch (15.2 cm) dia., motor-driven three-lobed marine propeller was employed as agitator 14, this being driven at a speed of 50–300 rpm. To aid in the agitation and suspension of coated particles within volume 4, 4a four vertical fins 9, typically 1.5 inch (3.81 cm) wide, were provided, fixedly secured to the inside wall of tank 4 and spaced 90° apart.

The following examples utilized the same procedure as follows: First, the aqueous encapsulation-coagulation bath was prepared, in which an inorganic coagulating salt, a small amount of surfactant and an encapsulating polymer were thoroughly mixed together. The surfactant appears to facilitate drop ingress through the bath surface.

Latex was added to latex supply tube 7 to produce a given head and thereafter continuously added to maintain a preselected head pressure [typically, 1–4 inches $H_2O$ (2.54–10.16 cm $H_2O$)] on the upper ends of capillary tubes 6. For the examples reported, no bath solution was withdrawn from the bath during an operating run, thus the bath level rose due to the addition of the latex. Since draft tube 2 was hung from supply tube 7 by the strap hangers hereinbefore mentioned, supply tube 7-draft tube 2 could be elevated as a unit to maintain the exits of capillaries 6 about 1 inch (2.54 cm) above the bath surface level 5, which corresponded, in this instance, to maintain the upper edge of screen ring 3 about 0.25 inch (6.4 mm) above the bath surface while the lower edge was disposed about 0.75 inch (1.91 cm) below bath level 5. The surfactant employed was Duponal ® WAQE brand, which is a 30% aqueous sodium lauryl sulfate solution.

The apparatus detailed in FIGS. 1 and 2, and the foregoing description, was utilized for all three of the following examples, wherein Examples 1-3, respectively, correspond to Marquisee application Ser. No. 700,965 Examples 41-43, respectively:

EXAMPLE 1

The following aqueous solutions were well-mixed in tank 1:

10000 ml. 15% ammonium chloride
9500 ml. 0.03% surfactant
500 ml. Ludox ® 130M colloidal silica. This product is a 30% solids, acidic, aqueous dispersion of positively-charged colloidal particles consisting of a dense silica core coated with positively-charged polymeric alumina. The approximate chemical composition is $SiO_2=26\%$, $Al_2O_3=4.0\%$, $Cl=1.4\%$, $MgO=0.2\%$, viscosity (25° C)=5–15 cp, pH (25° C)=4.3–4.5, approximate particle diameter=16 m$\mu$, and specific gravity (25° C)=1.23.

The bath thus prepared had a pH of 5.4.

While providing agitation, (increasing gradually from 50–300 rpm as more product particles formed) 3480 g. of neoprene latex (containing 40% solids, like latex No. 2 Marquisee application Ser. No. 700,965, supra) was added through latex supply tube 7 over a period of 13 minutes. Simultaneously the pH of the bath was maintained at 5.4 by gradual addition of 51 ml. 1N HCl.

Immediately following the 13-minute latex addition period, agitation was continued for 17 minutes with no further addition of acid, during which time the pH of the bath rose to 6.6. The product particles were kept in suspension during the 17-minute holding period.

The agitator was turned off, the particles were allowed to settle and the supernatant liquid was separated from the particles by decantation.

The particles were washed by addition of 8000 ml. distilled water followed by a 5-minute agitation period. The agitator was then turned off and the supernatant liquid was separated from the particles by decantation. This washing procedure was repeated twice.

The particles were allowed to dry in the air to a constant weight of 1315 g. They were free-flowing and non-sticking.

EXAMPLE 2

The following aqueous solutions were well mixed in tank 1:

10000 ml. 15% ammonium chloride
9950 ml. 0.03% surfactant
50 ml. Positive Sol SM30

The bath thus prepared had a pH of 5.3. Positive Sol SM30 is a solution prepared by slowly adding 500 g. 35% Niaproof ® (boric acid-stabilized basic aluminum acetate solution manufactured by Union Carbide Corporation) to 400 g. Ludox ® SM30 (an aqueous colloidal sol containing approximately 30% $SiO_2$, ave. particle size 7 millimicrons, ratio weight $SiO_2:Na_2O=50$, pH at 25° C 9.90; freezing point 0° C in a blender. The mixture was filtered through coarse filter paper to remove a small amount of gel.

While providing agitation, [progressively increasing from 50 to 300 rpm as in Example 1, supra) 3590 g. of neoprene latex (which was like latex No. 1 Marquisee application Ser. No. 700,965) containing 40% solids] was added to the bath through latex supply tube 7 over a period of 9 minutes, during which time the pH of the bath rose to 6.7. Agitation was continued, keeping the particles in suspension for an additional 51 minutes, with no appreciable change in pH of the bath.

The agitator was turned off, the particles were allowed to settle and the supernatant liquid was separated from the particles by decantation.

The particles were washed by addition of 8000 ml. distilled water followed by a 10-minute agitation period. The agitator was then turned off and the supernatant liquid was separated from the particles by decantation. This washing procedure was repeated three times.

The particles were allowed to dry in the air to a constant weight of 1446 g. They were free-flowing and non-sticking.

EXAMPLE 3

The following aqueous solutions were mixed in tank 1:

10000 ml. 15% ammonium chloride
9950 ml. 0.03% surfactant
50 ml. Positive Sol SM30

The bath thus prepared has a pH of 5.2.

While providing agitation (progressively increasing from 50 to 300 rpm as in Example 1 supra) 4578 g. of neoprene latex (like Latex No. 2 Marquisee application Ser. No. 700,965) (containing 40% solids) was added through latex supply tube 7 over a period of 18 minutes, during which time the pH rose to 6.7. Agitation was continued, keeping the product particles in suspension for an additional 42 minutes, with no appreciable change in pH of the bath.

The agitator was turned off, the particles were allowed to settle and the supernatant liquid was separated from the particles by decantation.

The particles were washed by addition of 20,000 ml. distilled water followed by a 10-minute agitation period. The agitator was then turned off and the supernatant liquid was separated from the particles by decantation. This washing procedure was repeated once.

The particles were allowed to dry in the air to a constant weight of 1767 g. They were free-flowing and non-sticking.

Although the foregoing examples are for batch operation with removal of coated particles at the conclusion of each experiment, the process can be operated continuously by providing an overflow tube, or, preferably, a multiplicity of such tubes, in vessel 1, filtering off the suspension of particles removed via the tubes, and recycling the filtrate with appropriate composition adjustment.

It will be understood that this invention can be modified in numerous respects without departing from its essential spirit. Thus, a solid metal ring weir of diameter appreciably larger than the outside diameter of draft tube 2 can be substituted for screen ring 3, in which case a horizontally disposed (or inclined) annular screen barring passage of product particles would be installed between the lower end of the ring and the draft tube, so that bath liquid would freely clear the screen and thence flow into the upper end of draft tube 2 while the solid ring body would bar foam from the draft tube.

What is claimed is:

1. A method for encapsulating and coagulating elastomer latices comprising, in sequence, supplying said latices as multiple streams of separate drops by gravity fall through the surface of an encapsulating-coagulating liquid, followed by liquid-impelled generally linear transit of the particles through a vertically oriented flow-constrained zone to which encapsulating-coagulating liquid is supplied continuously at the top end and suspending the particles outside said flow-constrained zone while recycling said encapsulating-coagulating liquid from the lower end of said flow-constrained zone into said top end free of solid product particles.

2. A method for encapsulating and coagulating elastomeric latices according to claim 1 wherein said liquid is subjected to at least some turbulent flow in its transit from the discharge end of said flow-constrained zone to the top end of said flow-constrained zone.

* * * * *